United States Patent [19]
Kobayashi

[11] 3,757,655
[45] Sept. 11, 1973

[54] ELECTRONICALLY CONTROLLED CAMERA SHUTTER

[75] Inventor: Tatsuo Kobayashi, Osaka, Japan

[73] Assignee: Minolta Camera Kabushiki Kaisha, Osaka, Japan

[22] Filed: Dec. 16, 1971

[21] Appl. No.: 208,778

[52] U.S. Cl. ............... 95/10 CE, 95/53 EB, 95/63, 95/64 B
[51] Int. Cl. .......................... G03b 7/08, G03b 9/24
[58] Field of Search ........... 95/10 C, 10 CE, 10 CT, 95/10 CD, 53 EB, 63, 64 B

[56] References Cited
UNITED STATES PATENTS

| | | | |
|---|---|---|---|
| 3,375,769 | 4/1968 | Kiper | 95/63 |
| 3,638,544 | 2/1972 | Kitai | 95/10 CT |
| 3,662,664 | 5/1972 | Goshima | 95/63 |
| 3,353,462 | 11/1967 | Suzuki | 95/10 CT |
| 3,348,460 | 10/1967 | Schmitt | 95/10 CT |

*Primary Examiner*—Joseph F. Peters, Jr.
*Attorney*—Stanley Wolder

[57] ABSTRACT

An electronically controlled shutter comprises a braking mechanism for braking the movement of a sector opening member so as to open the shutter diaphragm sectors at a lower speed than when they are closed, a diaphragm setting member for manually setting the diaphragm aperture value and a photoreceptor for measuring the light reflected from the film surface so as to automatically control exposure by integrating the output of the photoreceptor. The shutter further includes a mechanism for selectively enabling or disabling the braking mechanism, whereby the shutter is adapted for both programming exposure and diaphragm preset exposure.

19 Claims, 9 Drawing Figures

3,757,655

ELECTRONICALLY CONTROLLED CAMERA SHUTTER

BACKGROUND OF THE INVENTION

The present invention relates to an electronic shutter the shutter speed of which is automatically controlled by measuring the light reflected from the film surface, more particularly to improvements in an electronic shutter of the type wherein the diaphragm aperture is preset at a suitable value and the measurement of the reflected light is initiated upon the sectors being initiated into an opening action so as to control the exposure time automatically.

The electronically controlled shutter of the diaphragm preset exposure type heretofore used includes indicator means such as a lamp for indicating excessive brightness for which automatic exposure is unavailable so that if an improper diaphragm aperture value is set when a subject of a relatively high brightness is to be photographed, the indicator means emits a signal. Accordingly, the camera of this type is troublesome to handle in that when such signal is emitted, the diaphragm has to be reset to provide a smaller diaphragm aperture.

Electronically controlled shutters for automatically controlling the shutter speed are of two systems: one being the so-called programming exposure system wherein the shutter speed and the diaphragm aperture of the camera objective lens, factors which determine an exposure, are set with predetermined combinations for automatic determination of exposure and the other being the diaphragm preset exposure system wherein the diaphragm aperture value of the lens is set beforehand by a manually movable member to automatically determine the exposure time.

Each of these two systems has advantages and disadvantages peculiar thereto. For example, the programming exposure system assures a very easy photographing operation and is therefore suitable for beginners because the exposure is automatically controlled merely be depressing the shutter button free of a troublesome adjustment of the diaphragm aperture, whereas it is not adapted for more sophisticated photographing skill in being incapable of varying exposure time or diaphragm aperture since the combination of exposure time and diaphragm aperture value for a given subject is automatically determined. On the other hand, the diaphragm preset system has the aforementioned drawback because it is necessary to previously determine the diaphragm aperture value of the objective lens, which narrows the range in which the shutter is adapted for an automatic exposure.

These drawbacks will be eliminated by an electronically controlled shutter which is operable on both the programming exposure system and diaphragm preset exposure system.

SUMMARY OF THE INVENTION

An object of this invention is to provide an electronically controlled shutter of the diaphragm preset exposure type wherein even when an improper diaphragm aperture value is set for a subject of relatively high brightness, the sectors are automatically closed before the sectors are opened to the diaphragm aperture setting so as to provide a proper exposure to the film in accordance with the brightness of the subject, the sectors being adapted to be closed in response to the output of a photocell which measures the reflected light from the film surface indicating the extent of opening of the sectors.

Another object of this invention is to provide an electronically controlled shutter whereby photographs can be taken on the programming exposure system wherein the exposure making operation is controlled fully-automatically by merely depressing the shutter button to give a proper exposure to the film, the shutter further being adapted for a photographing operation of the diaphragm preset exposure type of system.

In accordance with this system, a sector opening member for driving the sectors in the opening direction to expose the sensitive coating of the film is provided with braking means so as to permit the sectors to open more slowly than when they are closed. The braking means exerts a braking action on the sector opening member during the period from the initiation of sector opening action until the termination thereof.

A diaphragm setting member for manually setting the diaphragm aperture value is rotatably mounted, for instance, on the lens barrel of the camera. Part of the diaphragm setting member or a member operatively associated therewith stops the movement of the sector opening member at a position where the sectors controlled thereby define the preset diaphragm aperture.

A photoreceptor disposed within the camera body has a photocell for receiving the light reflected from the film face when the sectors start to open, and the exposure of the sensitive coating on the film is controlled by an exposure time control electric circuit which integrates the output of the photoreceptor to automatically determine and thereby control the exposure time.

Thus, the depression of the shutter button permits the sectors to start opening, whereupon the electric circuit starts to integrate the output of the photoreceptor. While being braked during the opening action by the braking means acting on the sector opening member, the sectors progressively open to give a diaphragm aperture of the preset value. While the sectors are open, the electric circuit continues to integrate the output of the photoreceptor until the integrated voltage reaches a predetermined value, whereupon the circuit actuates a sector closing member to close the sectors. Accordingly, if a preset diaphragm aperture value is outside the range in which the shutter is automatically operable for a given subject of a high brightness, the sectors close before they are opened to the diaphragm aperture setting to complete exposure immediately when it is detected that the sensitive coating of the film has been given a proper amount of exposure. If the preset diaphragm aperture value is within the range of automatic exposure operation for a highly bright subject, the sectors will of course open to the diaphragm aperture preset by the diaphragm setting member and close upon the integrated voltage reaching the predetermined value.

The braking means causes the sectors to move more slowly for opening action than for closing action, assuring that the photocell will function to measure the light while the sectors are opened, while ensuring integration of the output from the photoreceptor by the exposure time control electric circuit.

In order to enable the camera to take photographs both on programming exposure system and diaphragm preset exposure system, there is provided means for latching or unlatching the braking means for the sector opening member by a diaphragm setting member or by some other member.

Thus when a photograph is to be taken with the programming exposure system, the diaphragm setting member is manipulated to set the diaphragm at the value of maximum aperture of the objective lens or greater and the sector opening member is braked by the braking means to make the sectors open at a lower speed than when they close.

Accordingly, until the sectors open to the maximum diaphragm aperture or before they open to the maximum aperture, the electric circuit for controlling exposure time integrates the output of the light receiving portion to actuate the sector closing member and thereby close the sectors upon detecting that the integrated voltage has reached the predetermined value.

If photographs are to be taken with the diaphragm preset exposure system, a desired diaphragm aperture value is set by the diaphragm setting member and the braking means is unlatched from the sector opening member to free the member from braking action. The unlatching of the braking means can be effected in operative relation to the diaphragm setting operation by the diaphragm setting member.

Upon depression of the shutter button, the sectors open quickly to the preset diaphragm aperture, permitting the photoreceptor to measure the reflected light from the film face in proportion to the diaphragm aperture. The resulting output is integrated by the exposure time control electric circuit and when the integrated voltage has reached a predetermined voltage, the circuit actuates the sector closing member to instantaneously close the sectors.

Thus photographs can be taken either with the programming exposure system or with the diaphragm preset exposure system as desired.

Other objects and features of this invention will become more apparent from the following description with reference to embodiment of this invention.

DESCRIPTION OF THE PREFERRED EMBODIMENTS

Figure 1:
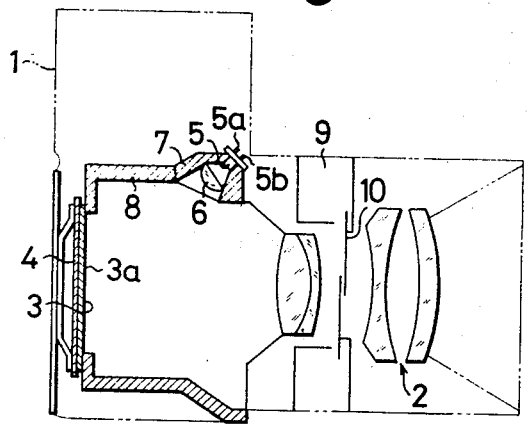
FIG. 1 is a view in vertical section schematically showing the construction of a camera to which the present invention is applied.

Referring to FIG. 1, the reference numeral 1 indicates a camera body and the numeral 2, an objective lens. A photographic film 3 set in the camera body 1 is retained in position by a film pressing plate 4, with its reflecting face 3a directed toward the lens 3. A photocell 5 is retained by a holder 7 at a position suitable for receiving light reflected from the surface 3a through a condenser lens 6. The photocell receives the diffused reflected light mainly from the upper half of the reflecting surface 3a. The photocell 5 may preferably be a cell such as a photovoltaic cell which is quick to respond to changes in the intensity of light. The holder 7 for the photocell is positioned at an upper portion of a dark case 8. A sector case 9 accommodates a sector opening and closing mechanism to be described later. Sectors 10 which are operated by the sector opening and closing mechanism are positioned in the light path of the lens 2. The interior of the dark case 8 is light-tight. Terminals 5a and 5b connect the photocell 5 to an electric circuit for controlling exposure time to be described later.

Figure 2:
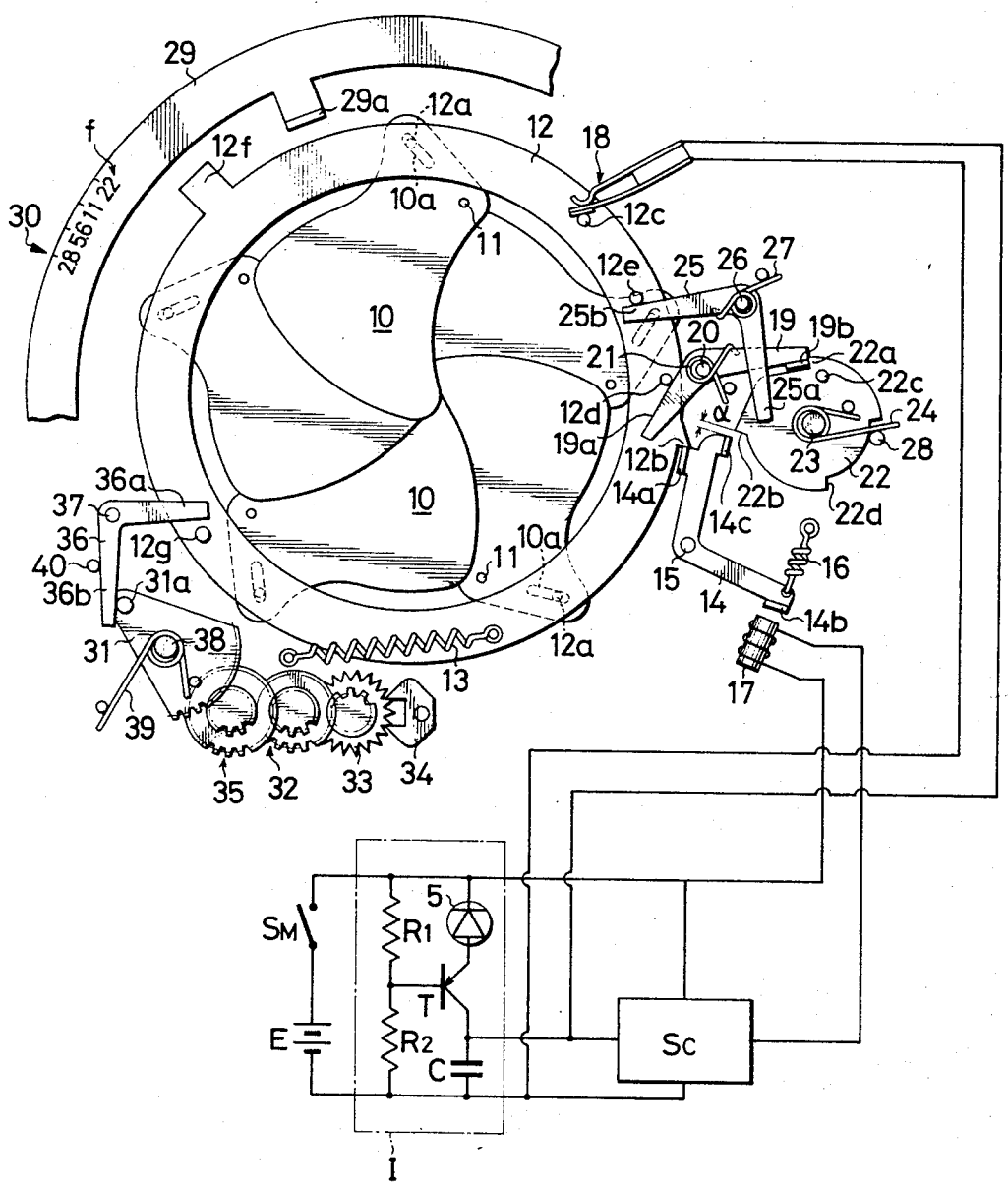
FIG. 2 is a front view showing the principal part of an electronic shutter embodying the present invention.

As shown in FIG. 2, each of the sectors 10 is pivoted on a pin 11 projecting from the sector case 9 or some other stationary member. Normally, a suitable number of sectors 10 are arranged in overlapping relation to block the light passing through the lens. Each of the sectors 10 has a slot 10a receiving therein a pin 12a on a sector opening member 12 which is rotated reciprocally about the optical axis of the lens by a mechanism to be described later. The forward rotation of the opening member 12 causes the sectors to open to define a set diaphragm aperture or a diaphragm aperture controlled by the exposure time control circuit and the backward rotation of the member 12 closes the sectors to the original state shown in FIG. 2.

In the case of a lens shutter the sector opening member 12 is usually in the form of an annular member as illustrated and is urged by a spring 13 in a clockwise direction all the time, with a projection 12b on its outer periphery in engagement with a latch portion 14a of a first latch lever 14 to tension the spring 13. When released from the first latch lever 14, the sector opening member 12 is driven in a clockwise direction in the drawing for a forward rotation.

The first latch lever 14 pivoted to the sector case 9 or the like as at 15 is urged by a spring 16 in a counter-clockwise direction in the drawing and has at its tail end a lug 14b facing an electromagnet 17 which is energized and de-energized by the exposure time control electric circuit. Upon energization, the electromagnet 17 attracts the lug 14b to pivotally move the latch lever 14 in a clockwise direction and to thereby unlatch the sector opening member 12, whereby the opening member 12 is initiated into action. De-energization of the electromagnet 17 permits the lever 14 to return to the original position under the action of the spring 16.

Pins 12c, 12d and 12e further project from the sector opening member 12.

With the sectors 10 in closed position, the pin 12c keeps a trigger switch 18 of the exposure time control electric circuit closed. It opens the trigger switch 18 to trigger the electric circuit upon the sector opening member 12 being initiated into movement in the sector opening direction.

The pin 12d is in contact with a driven portion 19a of a second latch lever 19 which is pivoted to the sector case 9 as at 20 and biased by a spring 21. A lug 19b at the front end of the second latch lever 19, positioned close to a notch 22a in the periphery of a sector closing member 22, engages in the notch 22a upon tensioning of the shutter to latch the sector closing member 22.

The sector closing member 22 is pivoted to the sector case 9 or the like as at 23 and urged by a spring 24 in a counterclockwise direction in the drawing. Unillustrated means tensions the spring 24 in operative relation to shutter cocking operation, whereupon the closing member 22 is latched in the position illustrated in FIG. 2.

The sector closing member 22 is further formed in its periphery with a projection 22b engageable with another lug 14c at the front end of the first latch lever 14, the arrangement being such that when the first latch lever 14 is pivotally moved with its lug 14b attracted to the electromagnet 17 upon energization thereof, the lug 14c is brought into the path of projection 22b to face the projection 22b.

When the first latch lever 14 moves pivotally as described above upon the energization of the electromagnet 17 to permitting the sector opening member 12 to start movement in the sector opening direction, the second latch lever 19 is moved in a counterclockwise direction to unlatch the sector closing member 22, whereupon the sector closing member 22 starts to rotate in a counterclockwise direction. Consequently, the projection 22b comes into engagement with the lug 14c of the first latch lever 14, whereby the closing member 22 is prevented from further counterclockwise rotation and comes to a halt. In other words, the sector closing member 22 rotates counterclockwise a very small amount upon initiation of movement of the sector opening member 12. In order to allow for such a slight rotation, the lug 14c is spaced apart from the projection 22b by a small distance $\alpha$ in the state as illustrated in FIG. 2. The distance $\alpha$ serves to compensate for the time delay in the action of mechanically operating members during the exposure time controlling operation of the exposure time control electric circuit for high speed operation of the sectors (i.e., for making an exposure of a short duration).

The sector closing member 22 further has a pin 22c thereon in the path of which there is disposed a driven arm 25a of a closing lever 25.

The closing lever 25, pivoted to the sector case 9 or the like as at 26, is urged in a clockwise direction by a spring 27 and has a drive arm 25b in contact with a pin 12e on the sector opening member 12. The sector closing member 22 is further formed with a notch 22d in opposing relation to a stopper 28 which also serves as a retainer for holding the fixed end of the spring 24 so as to limit the angle of rotational displacement of the closing member 22 to a definite range.

After the projection 22b comes into engagement with the lug 14c of the first latch lever 14 to temporarily stop the counterclockwise rotation of the sector closing member 22, the exposure time control electric circuit detects that the film has received a suitable exposure by virtue of the opening of the sectors 10, whereupon the electromagnet 17 is de-energized. The de-energization of the magnet 17 permits the first latch lever 14 to immediately rotate in a counterclockwise direction under the action of spring 16, releasing the projection 22b from the lug 14c, with the result that the sector closing member 22 rotates in a counterclockwise direction under the action of the spring 24, causing the projection 22c to push the driven arm 25a of the closing lever 25 to rotate the lever 25 in a clockwise direction. As a result, the sector opening member 12 is driven in a counterclockwise direction to close the sectors 10 since the pin 12e is pushed by the drive arm 25b of the closing lever 25. This sector closing action takes place instantaneously upon the deenergization of the electromagnet 17. Thus, the springs incorporated in the above construction are such that under any conditions, the sum of the force of the spring 24 acting on the sector closing member 22 and the force of the spring 27 acting on the closing lever 25 is sufficiently greater than the force of the spring 13 acting on the sector opening member 12.

The exposure time control electric circuit for controlling the opening and closing action of the sectors 10 comprises an integration circuit I including a circuit of a photocell 5 such as a photovoltaic cell, a transistor T and an integrating capacitor C connected in series and resistors $R_1$ and $R_2$ connected in parallel to the circuit and having a connection therebetween coupled to the base of the transistor T to control the voltage across the photocell 5 to a predetermined level; a switching circuit $S_C$ for energizing the electromagnet 17 by loading the winding of the electromagnet 17 with the voltage of the power source E upon closing of the main switch $S_M$ and for de-energizing the electromagnet 17 by discontinuing supply of current to the winding immediately when the voltage across the capacitor C exceeds a given level; and a trigger switch 18 which is opened upon the sector opening member 12 being initiated into movement in the sector opening direction and is closed upon the completion of the backward movement of the sector opening member 12, the main switch $S_M$ being adapted to close in operative relation to the depression of the shutter button to open and close the sectors 10. Thus the photo-receptor starts to measure the light upon the initiation of opening of the sectors 10 to control the exposure of the sensitive coating of the film.

The means for presetting the diaphragm aperture of the objective lens comprises a diaphragm ring 29 rotatably mounted on the lens barrel and bearing diaphragm aperture values $f$. The aperture value is set to a mark 30 on a stationary member. The diaphragm ring 29 has an arm 29a having a lug at its distal end which extends to the path of movement of an arm 12f extending from the outer periphery of the sector opening member 12.

More specifically, by manually rotating the diaphragm ring 29 to align the desired diaphragm aperture value $f$ with the mark 30, the arm 29a is shifted to a set position corresponding to the diaphragm aperture value $f$. The arm 12f of the sector opening member 12 which is initiated into rotation by the depression of the shutter button hits the arm 29a, which therefore prevents further rotation of the sector opening member 12 at this position so as to permit the sectors 10 to define an aperture corresponding to the diaphragm aperture setting.

For diaphragm aperture value setting, the mark 30 may alternatively be positioned on the diaphragm ring 29 for registry with the diaphragm aperture values $f$ indicated on a stationary member on the lens barrel. Further in place of the foregoing construction wherein the diaphragm ring 29 directly restricts the rotation of the sector opening member 12 to give the preset diaphragm aperture, an intermediate member may be provided which is operated by the diaphragm ring 29 to limit the rotation of the sector opening member 12 and thereby obtain a preset diaphragm aperture.

The means for braking the opening movement of the sectors 10 comprises, for instance, a delaying mechanism such as a slow governor and a braking lever 36. The delaying mechanism is composed of a sector gear 31, a gear system 32 meshing with the gear 31, an escape wheel 33 in operative relation to the gear system 32 and an anchor 34 to be reciprocally pivotally moved by the escape wheel 33. The braking lever 36 is pivoted to the sector case 9 as at 37 and has a driven arm 36a in engagement with a pin 12g on the sector opening member 12 and a drive arm 36b in engagement with a pin 31a on the sector gear 31. The sector gear 31, pivoted to the sector case 9 or the like as at 38, is urged by a spring 39 in a counterclockwise direction in the drawing. The position of the braking lever 36 is determined by a stopper 40.

When the diaphragm ring 29 is operated to set the diaphragm aperture, for example, at $f\,11$ and the shutter button is then depressed, the electromagnet 17 is energized to actuate the sector opening member 12 to effect the aforementioned sector opening and closing action. Upon the initiation of operation of the sector opening member 12, the pin 12g thereon pushes the braking lever 36 pivotally in a counterclockwise direction. The braking lever 36 in turn rotates the sector gear 31 in a clockwise direction in the drawing through a pin 31a thereon. However, since the sector gear 31 constitutes the known delaying mechanism along with the gear system 32, escape gear 33 and anchor 34, the delaying mechanism 35 acts on the sector opening member 12 through the braking lever 36, so that the movement of the sector opening member 12 in the sector opening direction is braked to open the sectors 10 at a lower speed than when they are closed.

Figure 3:
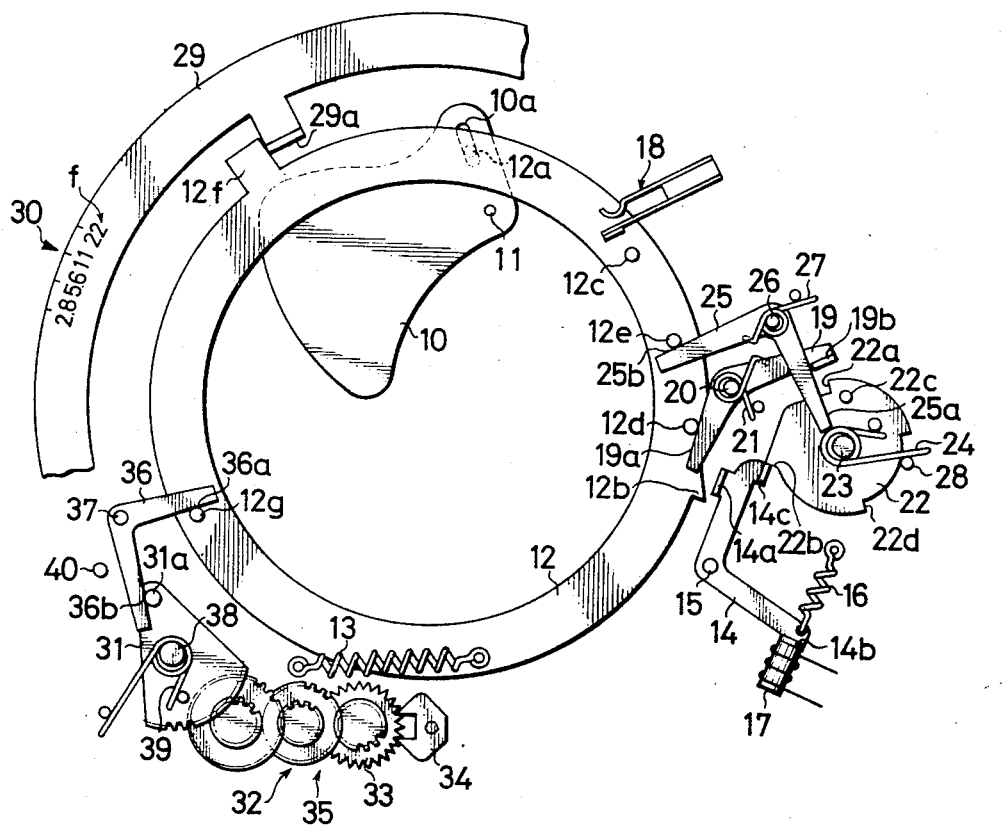
FIG. 3 is a front view showing the same as the sectors have been opened to the diaphragm aperture setting.

FIG. 3 shows a state wherein the sectors 10 have been completely opened with the diaphragm aperture set at $f\,11$. In this state, the closing member 22 is prevented from counterclockwise rotation by the first latch lever 14. De-energization of the electromagnet by the exposure time control electric circuit immediately unlatches the sector closing member 22 from the first latch lever 14, permitting the member 22 to rotate counterclockwise and close the sectors 10 as already described. The parts are now in the state illustrated in FIG. 4.

Figure 4:
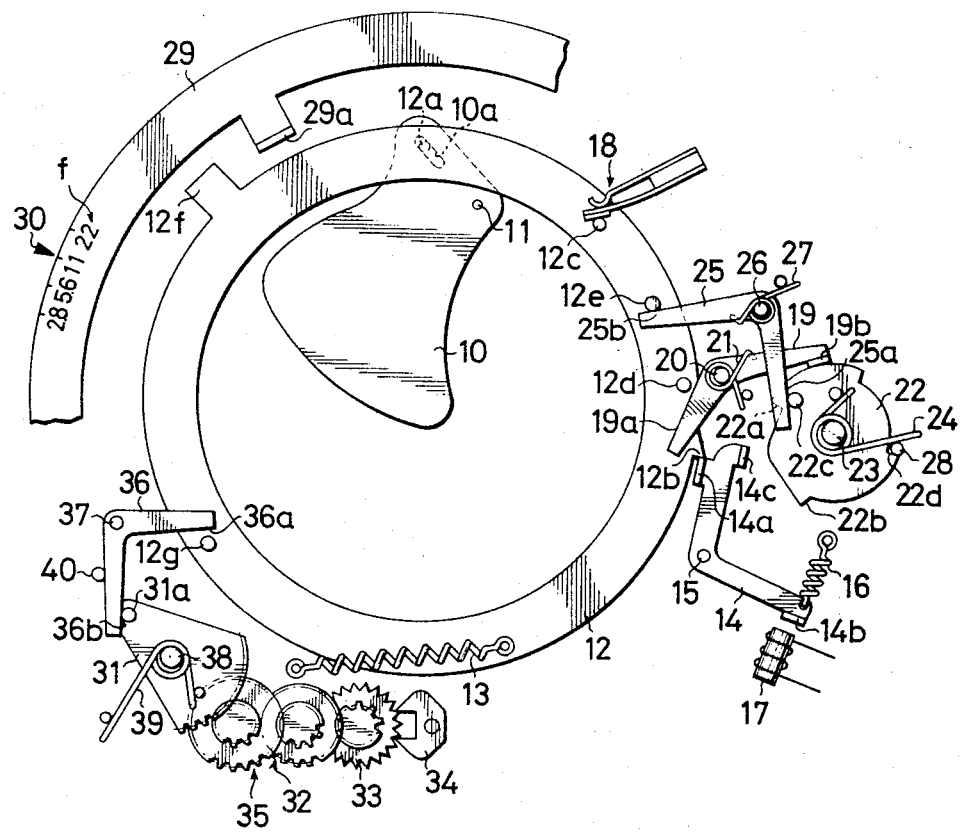
FIG. 4 is a front view showing the same as the sectors have been closed by a sector closing member.

When the shutter is cocked after the sectors 10 have completely closed as seen in FIG. 4, the sector closing member 22 is driven in a clockwise direction, permitting the lug 19b of the second latch lever 19 to engage in the notch 22a to thereby retain the member 22 in its cocked position (see FIG. 2).

Figure 5:
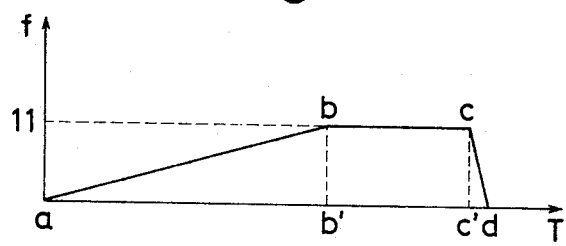
FIGS. 5 and 6 are views illustrating the operation of the embodiment of FIG. 2.

FIG. 5 diagrammatically shows the operation of the sectors 10 wherein it is assumed that the diaphragm aperture is set at $f\,11$. The diaphragm aperture value $f$ is plotted as ordinate vs. the exposure time T as abscissa.

The depression of the shutter button permits the sector opening member 12 to start to open while being braked by the braking mechanism, progressively enlarging the diaphragm aperture from point $a$ to point $b$. At time $b'$, the diaphragm aperture for the setting $f\,11$ is obtained, whereupon the sector opening action is completed. On the other hand, the exposure time control circuit starts to measure the light with its photoreceptor simultaneously with the initiation of opening of the sectors for charging the capacitor C of the integration circuit I. Upon the lapse of a time suitable for giving a proper exposure to the sensitive coating of the film after the diaphragm aperture of $f\,11$ is obtained, namely at point $c$ where the voltage across the capacitor C exceeds a predetermined level, the circuit de-energizes the electromagnet 17 to initiate the sector closing member into operation. The sectors are completely closed at point $d$. Thus, the amount of exposure during the exposure time of $a$ to $d$ corresponds to the area defined by lines $ab$, $bc$, $cd$ and $ad$.

Figure 6:
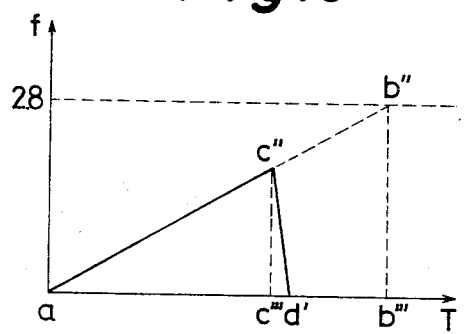

The foregoing description applies to the case wherein the diaphragm aperture setting is within the range of automatic exposure making operation for a highly bright subject. If the diaphragm aperture is set, for example, at $f\,2.8$ and the subject has a relatively high brightness outside the range of automatic exposure, the shutter exhibits an operation as illustrated in FIG. 6.

It is assumed that when the sectors start to open upon the depression of the shutter button, the aperture gradually enlarges along the line $ab''$, requiring a time $b'''$ for the diaphragm to open to the aperture of $f2.8$. At time $b'''$, however, an overexposure will result, and in hence objectionable. Accordingly, the exposure time control circuit, with its photoreceptor starting to measure the light upon the initiation of exposure to start charging the intergrating capacitor C, de-energizes the electromagnet upon detecting that the voltage across the capacitor C has exceeded the predetermined level at point $c''$, namely at time $c'''$, with the result that the sectors start to close at point $c''$ and complete the closing action at point $d'$. Thus, an amount of exposure corresponding to the area defined by the lines $ac''$, $c''d'$, and $ad'$ is given to the sensitive coating. In this way, a subject of a relatively high brightness can be photographed with a proper exposure at whatever value the diaphragm aperture may be set within or outside the range of automatic exposure for highly bright subjects.

Although the foregoing description and drawings cover the sector opening and closing mechanism which serves both as diaphragm means and shutter means, namely as a shutter acting as diaphragm blades and shutter blades, there may be provided additional diaphragm blades for manually setting the diaphragm aperture. Unlike in the foregoing construction wherein, even when the diaphragm aperture setting is within the range of automatic exposure for highly bright subjects, the sectors are temporarily halted upon the sectors being opened to the preset diaphragm aperture, the sectors in this case will be switched into a closing action upon completion of an opening action.

Further the first latch lever 14 can be engaged with or disengaged from the sector opening member 12 and the sector closing member 22 at such positions where the movement of the first latch lever 14 has been accelerated by gear means or the like so as to effect the engagement or disengagement with a smaller force.

With reference to the foregoing embodiment, description will now be given of an electronically controlled shutter adapted both for programming exposure and diaphragm preset exposure.

Figure 7:
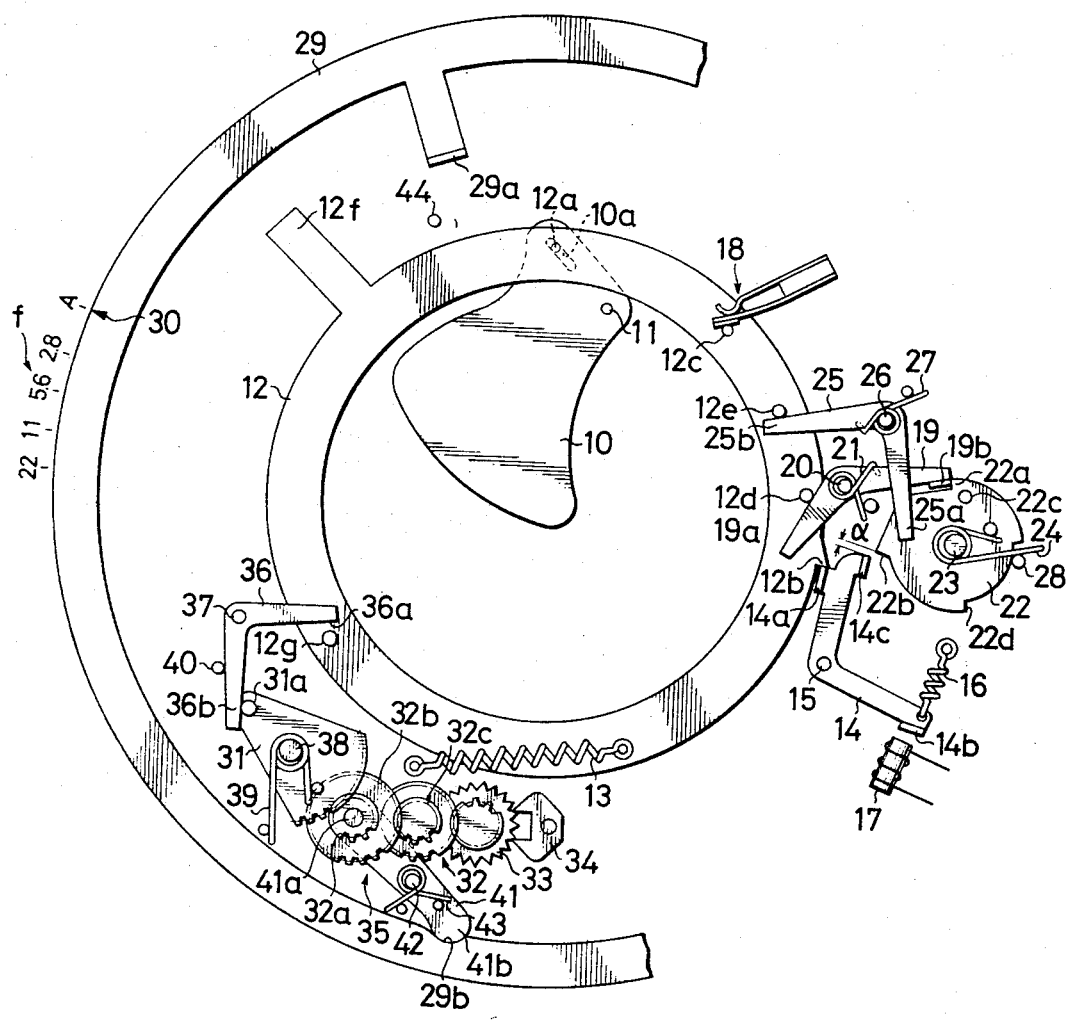
FIG. 7 is a front view showing the principal part of an electronic shutter in accordance with this invention by which photographs can be taken both on the programming exposure system and diaphragm preset exposure system, the shutter being set for programming exposure.
Figure 8:
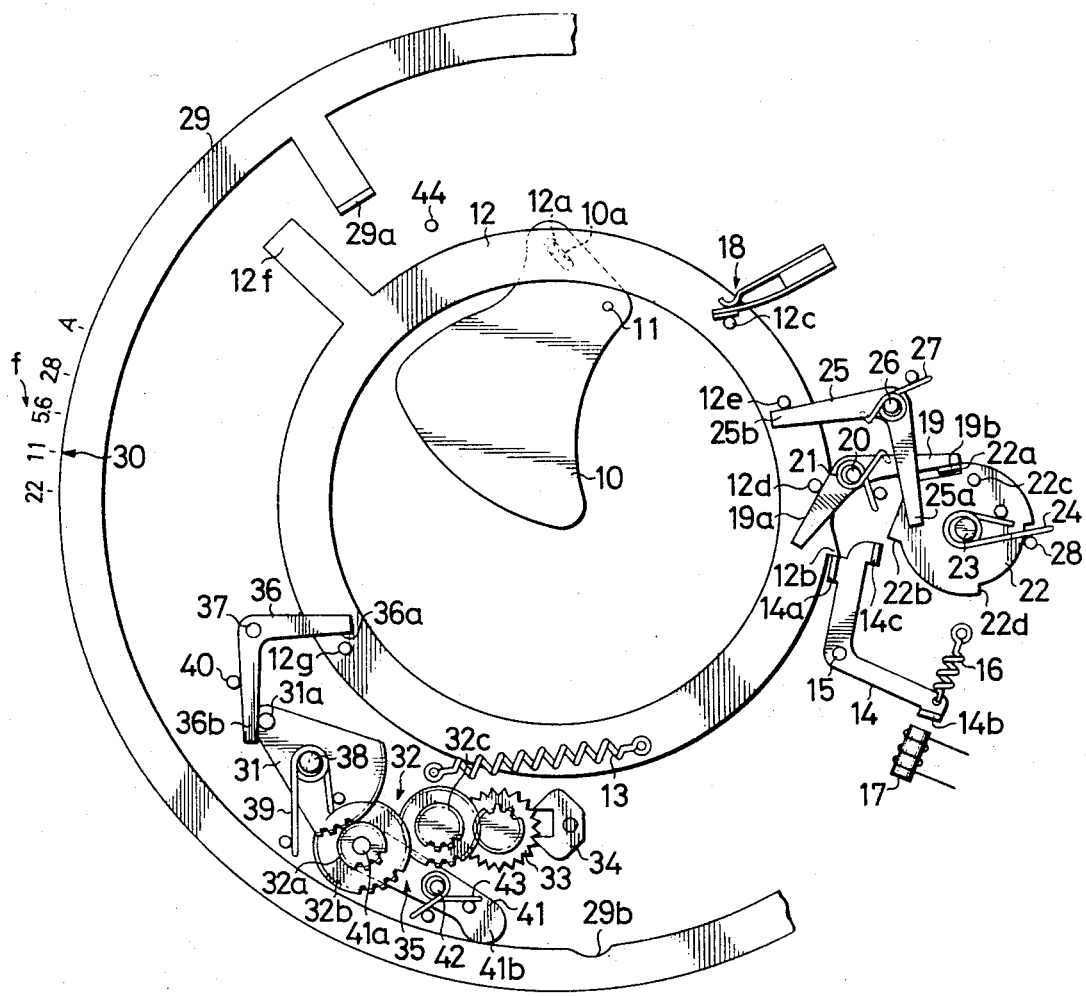
FIG. 8 is a view showing the embodiment of FIG. 7 as the shutter is set for diaphragm preset exposure.

With reference to FIGS. 7 and 8, the diaphragm ring 29 is formed with a cam face 29b at a suitable position in its inner periphery. The gears 32a and 32b included in the gear system 32 of the braking mechanism are supported on a pin 41a at the distal end of a change-over lever 41 pivoted to the sector case 9 or the like as at 42. The lever 41 is urged by a spring 43 in a clockwise direction in the drawing to bring its tail end 41b into contact with the inner face of the diaphragm ring 29, the arrangement being such that when the mark 30 on the ring 29 is set to a symbol A, the tail end 41b engages in the cam face 29b to cause the gear 32a to engage with the sector gear 31 and the gear 32b to engage with the gear 32c as shown in FIG. 7, while when the diaphragm ring 29 is operated to set the mark 30 to the desired aperture value f, the tail end 41b is pushed out of the cam face 29b into contact with the inner face of the diaphragm ring 29 so as to disengage the gear 32a from the gear 31 and the gear 32b from the gear 32c as seen in FIG. 8. A stopper 44 defines the maximum aperture of the sectors when the mark 30 on the diaphragm ring 29 is set to the symbol A.

Thus the setting of the mark 30 to the symbol A causes the tail end 41b of the changeover lever 41 to engage the cam face 29b as shown in FIG. 7, effecting engagement between gears 31 and 32a and between gears 32b and 32c, so that when the shutter button is depressed to initiate the sector opening movement of the sector opening member 12, a braking force acts on the member 12 so as to open the sectors at a lower speed than when they are closed.

Figure 9:
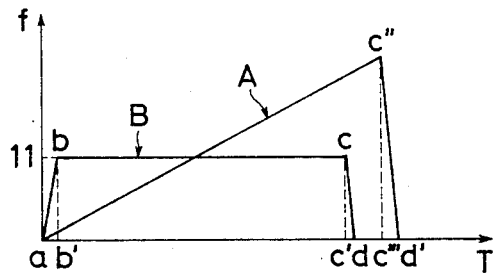
FIG. 9 is a view illustrating the operation of the embodiment of FIG. 7.

More specifically, the opening movement of the sectors 10 proceeds along the line ac″ as indicate at A in FIG. 9 to enlarge the aperture while permitting the exposure time control circuit to measure the reflected light incident on its photoreceptor. The moment the voltage across the integrating capacitor exceeds a definite level, namely at point c″ in FIG. 9, the circuit actuates the sector closing member 22 to close the sectors for completion of exposure. In this case, the diaphragm aperture is automatically controlled by the exposure time control circuit, making it possible for the camera to take a photograph on the programming exposure system wherein both exposure factors, i.e., exposure time and diaphragm aperture are controlled automatically.

On the other hand, when a photograph is to be taken on a diaphragm preset exposure system, the mark 30 on the diaphragm ring 29 is set to the desired diaphragm aperture value, for example, at f 11 as shown in FIG. 8, whereby the tail end 41b of the changeover lever 41 is pushed out of the cam face 29b into contact with the inner face of the diaphragm ring 29. The lever 41 is therefore turned about the pivot 42 in a counterclockwise direction in the drawing, freeing the gears 31, 32a and gears 32b, 32c from meshing engagement respectively. The sector opening member 12 is now free of a braking action.

Accordingly, the depression of the shutter button in the state of FIG. 8 causes the sectors 10 to quickly open to the preset diaphragm aperture along the line ab as indicated at B in FIG. 9 and expose the sensitive coating. At point c which represents the moment when the voltage across the integrating capacitor C exceeds a predetermined level, the sectors close quickly along the line cd. In this way a photograph is taken with the diaphragm preset exposure system.

In this embodiment, the first latch lever 14 may also be engaged with or disengaged from the sector opening member 12 and sector closing member 22 at positions where the movement of the lever has been accelerated by gear means or the like instead of direct engagement or disengagement. The engagement or disengagement will then be effected with a smaller force.

Further in addition to the sectors 10, diaphragm blades may be provided exclusively for setting the diaphragm aperture. The diaphragm aperture may then be set manually by the diaphragm blades. In this case, the sectors are so adapted as to close immediately when opened to the maximum aperture.

Although the braking mechanism is engaged with or disengaged from the sector opening member in operative relation to the manipulation of the diaphragm ring in the foregoing embodiment, the engagement or disengagement may alternatively be effected by some other member. Further instead of meshing engagement or disengagement between the gears 31 and 32a and between gears 32b and 32c, another gear, sector gear, anchor or the like may be adapted for engagement or disengagement for this purpose. To this end it is likewise possible to utilize the engagement relation between the braking lever 36 and pin 12g.

Unlike in the embodiment in FIG. 2, the mark 30 in the above embodiment is provided on the diaphragm ring 29. However, the mark 30 can of course be positioned on a stationary member as in FIG. 2, with the diaphragm aperture values indicated on the diaphragm ring 29. Likewise, the mark and value indications in FIG. 2 may be changed as seen in FIG. 7.

What is claimed is:

1. An electronically controlled shutter for a camera having a shutter including blades functioning as diaphragm and shutter blades comprising:
    means including an opening member for driving said shutter blades in an opening direction,
    braking means for braking the movement of said opening member,
    diaphragm setting means having a stopping portion for intermediately halting the opening movement of said opening member, said diaphragm setting means being adjustable to permit said stopping portion to halt said opening member when said shutter blades have opened to a preset diaphragm aperture,
    photoreceptor means including a photocell for receiving and measuring the reflected light from the surface of film in said camera simultaneously with the start of said shutter blades opening to produce an output in accordance with the intensity of the incident light,
    an electromagnet, an exposure time control electric circuit means comprising an integration network including a capacitor for controlling said electromagnet in response to the integration of said output to thereby automatically control the exposure time, and
    means including a closing member actuated by said electromagnet when the voltage across said capacitor has reached a predetermined level so as to drive at least some of said shutter blades in a closing direction.

2. The electronically controlled shutter as set forth in claim 1 wherein said shutter opening blades and said shutter closing blades comprise the same shutter blades.

3. The electronically controlled shutter as set forth in claim 1 wherein said diaphragm setting means has comprises means having a control portion for controlling the engagement and disengagement between said sector opening member and said braking means.

4. The electronically controlled shutter as set forth in claim 3 including means for selectively setting the shutter in an exposure programming position and in a plurality of diaphragm preset exposure positions by adjusting said diaphragm setting means whereby when the shutter is set at the programming position said control portion functions to cause said braking means to brake the movement of said opening member and when the shutter is set at a diaphragm preset exposure position said opening member is free of braking action to permit said shutter opening blades to progressively open to define the preset diaphragm aperture, whereupon said blades come to a halt.

5. An electronically controlled shutter for a camera including shutter and diaphragm functioning blades comprising:
   an opening member for driving at least some of said blades in an opening direction,
   braking means for braking the movement of said opening member,
   a means including a manually operable changeover member for selectively engaging said braking means with or disengaging said braking means from said opening member,
   photoreceptor means including a photocell for receiving and measuring the reflected light from the surface of film in said camera simultaneously with the start of said shutter blades opening to produce an output in accordance with the intensity of the incident light,
   an electromagnet, an exposure time control electric circuit means comprising an integration network including a capacitor for controlling said electromagnet in response to the integration of said output to thereby automatically control exposure time, and
   means including a sector closing member actuated by said electromagnet when the voltage across said capacitor has reached a predetermined level so as to drive at least some of said shutter blades in a closing direction.

6. The electronically controlled shutter as set forth in claim 5 wherein said opening shutter blades and said closing shutter blades comprise the same shutter blades.

7. An electronically controlled shutter for a camera including shutter sectors comprising:
   means including a sector opening member for driving at least some of said sectors in an opening direction,
   means including a sector closing member for driving at least some of said sectors in a closing direction,
   braking means for braking the movement of said sector opening member so as to open said sectors at a lower speed than when said sectors are closed,
   photoreceptor means including a photocell for receiving and measuring the reflected light from the surface of film in said camera simultaneously with the start of opening of said sectors to produce an electrical output in accordance with the intensity of the incident light,
   an electromagnet, and
   an exposure time control electric circuit means comprising an integrating network including a capacitor for controlling said electromagnet in response to the integration of said output to automatically control exposure time whereby when the voltage across said capacitor reaches a predetermined level said electromagnet causes the sector driving member to close said sectors.

8. The electronically controlled shutter as set forth in claim 7 wherein said sectors serve as diaphragm blades and shutter blades.

9. The electronically controlled shutter as set forth in claim 8 including diaphragm setting means for manually presetting a diaphragm aperture for the camera objective lens.

10. The electronically controlled shutter as set forth in claim 9 wherein said diaphragm setting means includes means for stopping the opening movement of said sectors when the diaphragm aperture of said sectors reaches the preset diaphragm aperture value.

11. The electronically controlled shutter as set forth in claim 7 wherein said control circuit includes a switch, said electromagnet being energized by the closing of said switch and deenergized upon the voltage across said capacitor exceeding said predetermined level, said sector opening member being actuated by the energization of said electromagnet and said sector closing member being actuated by the de-energization of said electromagnet.

12. The electronically controlled shutter as set forth in claim 11 including a latch member movable between advanced and retracted positions and wherein said sector opening member is normally latched in its operation initiating position by said retracted latch member and is released for opening movement by said latch member being attracted and advanced upon the energization of said electromagnet, and said sector closing member being latched in its cocked position by said sector opening member and released from the latched position upon the initial advance of said sector opening member for movement to a latched position by said latch member after making a slight rotation, said sector closing member instantaneously moving in the sector closing direction upon said latch member being retracted upon the de-energization of said electromagnet.

13. The electronically controlled shutter as set forth in claim 12 wherein said sector opening member drives said sectors in their opening direction while being braked by said braking means during its forward movement and is instantaneously returned to its operation initiating position by said sector closing member to close said sectors when said sector closing member is unlatched from said latch member.

14. The electronically controlled shutter as claimed in claim 9 including means for enabling and disabling said braking means so as to selectively alternatively brake said sector opening member or free the same from its braking action.

15. The electronically controlled shutter as claimed in claim 14 wherein said braking means is engaged with or disengaged from said sector opening member under the control of said manual diaphragm setting means.

16. The electronically controlled shutter as set forth in claim 7, wherein said photocell comprises a photorolatic cell.

17. The electronically controlled shutter as set forth in claim 16 further comprising means including a constant current circuit (R1, R2, C) for coupling the output of said photocell (5) to said integration circuit (C) as constant current.

18. An electronically controlled shutter for a photographic camera including shutter exposure and closing blades comprising:
   an opening means for driving said exposure blades in their opening direction;

a closing means for driving said closing blades in their closing direction;

governor means for governing the movement of said opening means so as to open said exposure blades at a lower speed than the closing speed of said closing blades;

means including a photoreceptor including a photocell for receiving and measuring the reflected light from the surface of film in said camera simultaneously with the start of opening of said exposure blades to produce an output in accordance with the intensity of the incident light;

an electromagnet, and an exposure time control electric circuit means for controlling said electromagnet comprising an integration circuit including a capacitor for integrating the output of said photocell to thereby automatically control exposure time whereby when the voltage across said capacitor reaches a predetermined level, said electromagnet causes said closing means to close said closing blades.

19. The electronically controlled shutter as set forth in claim 18, further comprising means including a constant current circuit (R1, R2, C) for coupling the output of said photocell (5) to said integration circuit (C).

* * * * *

UNITED STATES PATENT OFFICE
CERTIFICATE OF CORRECTION

Patent No. 3,757,655          Dated September 11, 1973

Inventor(s) TATSUO KOBAYASHI

It is certified that error appears in the above-identified patent and that said Letters Patent are hereby corrected as shown below:

--30  Foreign Application Priority Data

Japan     December 25, 1970................45-125496

Japan     December 28, 1970................45-128454

Signed and sealed this 23rd day of April 1974.

(SEAL)
Attest:

EDWARD M. FLETCHER, JR.                C. MARSHALL DANN
Attesting Officer                       Commissioner of Patents